United States Patent
Chebli et al.

(10) Patent No.: US 12,241,403 B2
(45) Date of Patent: Mar. 4, 2025

(54) CHARGING SYSTEM OF AN INTERNAL COMBUSTION ENGINE

(71) Applicant: Dr. Ing. h.c. F. Porsche Aktiengesellschaft, Stuttgart (DE)

(72) Inventors: Elias Chebli, Aidlingen (DE); Donatus Wichelhaus, Goeppingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 18/379,243

(22) Filed: Oct. 12, 2023

(65) Prior Publication Data

US 2024/0125267 A1    Apr. 18, 2024

(30) Foreign Application Priority Data

Oct. 14, 2022    (DE) ............... 10 2022 126 859.4

(51) Int. Cl.
   *F02B 37/00*    (2006.01)
   *F02B 29/04*    (2006.01)

(52) U.S. Cl.
   CPC ........ *F02B 37/004* (2013.01); *F02B 29/0406* (2013.01); *F02B 29/0481* (2013.01)

(58) Field of Classification Search
   CPC . F02B 37/004; F02B 29/0406; F02B 29/0481
   See application file for complete search history.

(56) References Cited

U.S. PATENT DOCUMENTS

| | | | |
|---|---|---|---|
| 9,435,295 B2 | 9/2016 | Fischer | |
| 2010/0031935 A1* | 2/2010 | VanDyne | F02B 39/04 |
| | | | 475/196 |
| 2011/0209473 A1 | 9/2011 | Fritz et al. | |

(Continued)

FOREIGN PATENT DOCUMENTS

| | | |
|---|---|---|
| DE | 3124668 A1 | 1/1983 |
| DE | 102011018570 A1 | 10/2012 |

(Continued)

OTHER PUBLICATIONS

Machine Translation of JP07208178A (Year: 1995).*

(Continued)

*Primary Examiner* — Brandon D Lee
(74) *Attorney, Agent, or Firm* — Gerald E. Hespos; Michael J Porco

(57) ABSTRACT

A charging system (20) of an internal combustion engine has a compressor (22) that compresses intake air (41) to a pressure higher than a boost pressure of the internal combustion engine. A first energy recovery turbine (25) recovers energy from an exhaust gas mass flow (45) discharged from a cylinder (12). The compressor (22) and the first energy recovery turbine (25) are disposed on a first shaft (31) and the recovered energy is transmitted directly to the compressor (22). A cooling turbine (24) expands and cools the (intake) air (41) compressed by the compressor (22) to the boost pressure required by the cylinder (12). A second energy recovery turbine (26) recovers energy from the exhaust gas mass flow (45). The second energy recovery turbine (26) and the cooling turbine (24) are on a common second shaft (32), and the second shaft (32) is coupled to at least one energy sink.

8 Claims, 1 Drawing Sheet

(56) References Cited

U.S. PATENT DOCUMENTS

| | | | |
|---|---|---|---|
| 2012/0210952 A1* | 8/2012 | Reuss | B60K 6/485 |
| | | | 123/542 |
| 2016/0010539 A1* | 1/2016 | Verdoorn | F02B 37/162 |
| | | | 60/600 |
| 2019/0072026 A1 | 3/2019 | Rodriguez Erdmenger et al. | |
| 2020/0182137 A1* | 6/2020 | Carr | F02B 39/12 |
| 2021/0270181 A1* | 9/2021 | De Avila Antonini | |
| | | | F02B 37/10 |
| 2022/0235717 A1 | 7/2022 | Conway et al. | |
| 2022/0307408 A1 | 9/2022 | De Avila Antonini et al. | |

FOREIGN PATENT DOCUMENTS

| | | | |
|---|---|---|---|
| DE | 102019006517 A1 | | 3/2021 |
| GB | 2420152 | | 5/2006 |
| JP | 07208178 | | 8/1995 |
| JP | 07208178 A | * | 8/1995 |

OTHER PUBLICATIONS

German Search Report dated Feb. 9, 2023.
British Combined Search and Examination Report dated Jan. 26, 2024.

* cited by examiner

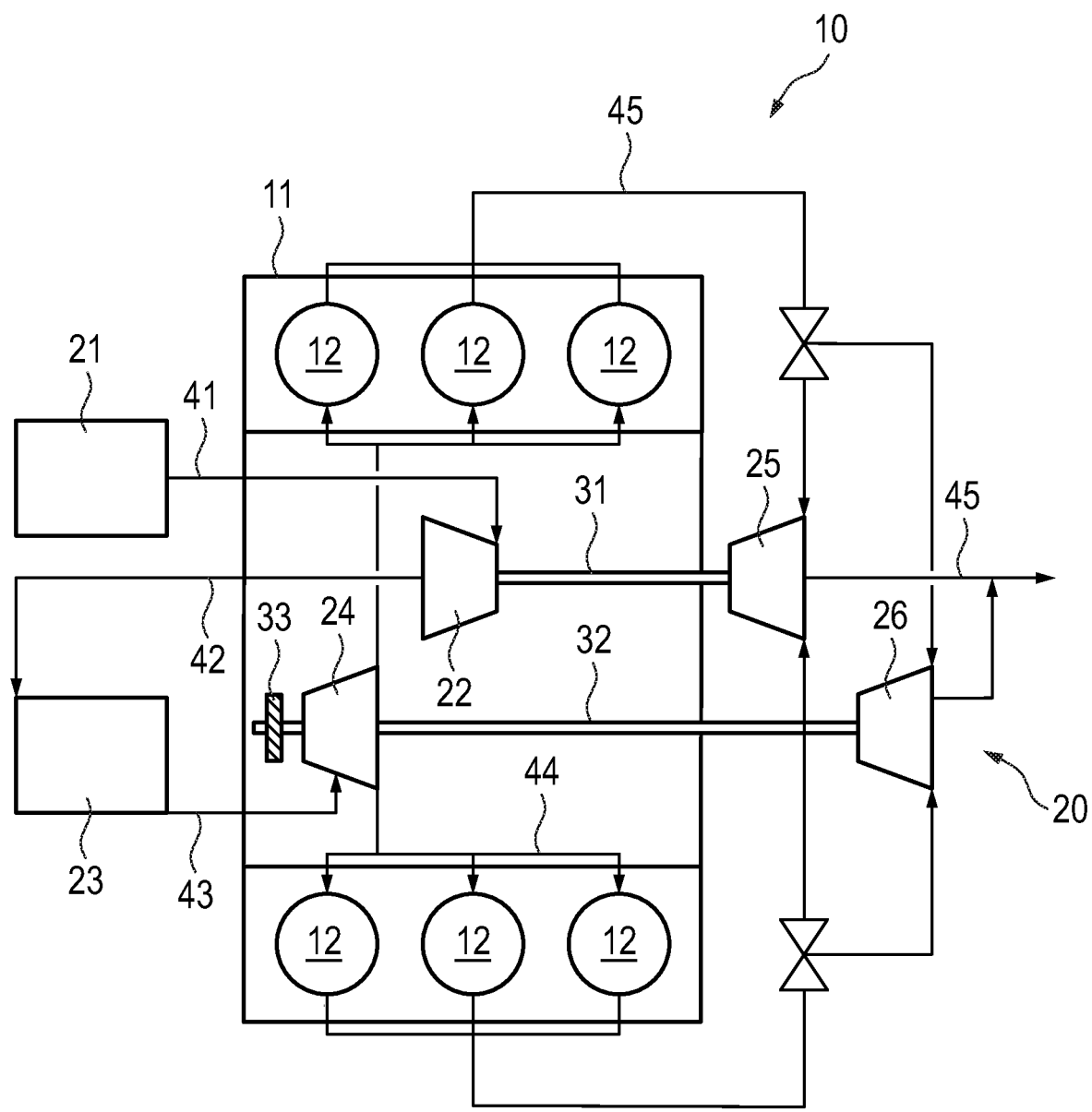

CHARGING SYSTEM OF AN INTERNAL COMBUSTION ENGINE

CROSS-REFERENCE TO RELATED APPLICATION

This application claims priority on German Patent Application No 10 2022 126 859.4 filed Oct. 14, 2022, the entire disclosure of which is incorporated herein by reference.

BACKGROUND

Field of the Invention

The invention relates to a charging system of an internal combustion engine and a method for providing boost air to a cylinder of an internal combustion engine.

Related Art

Turbochargers are used to optimize the performance of internal combustion engines in both purely combustion-powered vehicles and in hybrid vehicles that comprise an internal combustion engine and an electric drive. The turbocharger increases the density of the intake air for the cylinders and thus also the filling of the cylinder. The turbocharger typically uses the energy of the exhaust gas mass flow that is discharged during the exhaust stroke of the cylinders. A turbine extracts energy from the exhaust gas mass flow, and that energy is transmitted via a common shaft to a compressor for compressing the intake air.

US 2011/0209473 A1 discloses a system with a boost air cooler downstream of the compressor to increase the density of the charge air (boost air) and thereby increasing the power density of the internal combustion engine. The cooler charge air reduces the knocking tendency of gasoline engines, so that optimal ignition timing in terms of the center of gravity of the combustion can be applied, thereby increasing combustion efficiency and reducing fuel consumption.

DE 10 2019 006 517 A1 discloses an internal combustion engine with an exhaust gas turbocharger comprising a turbine, a compressor and an intercooler. A further turbine is provided downstream of the intercooler to drive a generator.

DE 10 2011 018 570 A1 discloses a compressor to supply compressed air to an engine. The compressor is driven as a turbocharger by exhaust gas that is discharged from the internal combustion engine. The compressor provides more air than is required by the engine. The excess air is expanded via a turbine that drives a generator and is fed back in upstream of the compressor.

US 2012/0210952 A1 discloses a motor vehicle with an internal combustion engine with an exhaust gas turbocharger having a turbine that can be driven by the air compressed by the compressor. The turbocharger is coupled to an electrical generator disposed in the intake tract downstream of the compressor. An intercooler is disposed downstream of the compressor and the turbine.

In view of the described prior art, it is an object of the invention to provide a charging system for an internal combustion engine that further increases the power density of an internal combustion engine and at the same time enables a compact design of the system. An object of the invention also is to provide a corresponding method for providing boost air to a cylinder of an internal combustion engine.

It should be noted at this point that the configurations of the invention disclosed in the description of the apparatus of the invention also apply to the method of the invention.

SUMMARY OF THE INVENTION

A charging system according to an embodiment of the invention comprises a compressor that is configured to compress intake air and produce a pressure that is higher than a boost pressure of the internal combustion engine. The boost pressure is understood to be the pressure that the intake air has for filling the cylinders. Therefore, when the cylinder is being filled, the intake air is compressed to a pressure level that is higher than that of the boost air of the internal combustion engine. The charging system further comprises a first energy recovery turbine that is configured to recover energy from an exhaust gas mass flow discharged from a cylinder. The compressor and the first energy recovery turbine are disposed together on a first shaft and the recovered energy thus is transmitted directly to the compressor. The charging system of this embodiment also may have a cooling turbine that is configured to expand, and thus also cool, the intake air compressed by the compressor to the boost pressure required by the cylinder. A second energy recovery turbine also may be provided and, like the first energy recovery turbine, is configured to recover energy from an exhaust gas mass flow discharged from the cylinder. The first and second energy recovery turbines of this embodiment are disposed in parallel and the exhaust gas mass flow therefore separates to operate the two energy recovery turbines. The second energy recovery turbine and the cooling turbine are on a common second shaft that may be coupled to at least one energy sink. In the context of this application, an energy sink is either an energy consumer or an energy store that can receive and consume or store the rotational energy of the shaft. Coupling is understood to be a connection that allows the energy of the shaft to be transmitted. An energy converter also may be provided to convert the rotational energy of the second shaft into electrical energy that can be used.

In comparison to the prior art, the charging system disclosed herein enables additional cooling of the boost air and thus a further increase in the power density of the internal combustion engine. The additional energy used for this purpose can largely be made usable again. At the same time, the charging system with the two shafts enables a compact and efficient arrangement.

In a further embodiment, the charging system further comprises a boost air cooler that is configured to cool the air compressed by the compressor in addition to the cooling turbine. This boost air cooler may be between the compressor and the cooling turbine. The boost air cooler provides an efficient way to further cool the boost air. The boost air cooler also can be operated by the energy produced at the second shaft.

In a further embodiment, the cooling turbine is configured to expand and cool the compressed air such that the temperature of the compressed air is the same as or preferably less than an ambient temperature of the intake air that is drawn in upstream of the compressor. This makes it possible to further increase the power density.

The second shaft may be coupled directly to the drive train, in particular the gear drive of the internal combustion engine, as an energy sink. Alternatively, or additionally, the coupling between the second shaft and energy sink is effected mechanically, in particular, by a planetary gear. The mechanical coupling provides a compact, inexpensive and long-lasting way to transmit power.

The coupling of the second shaft to the energy sink may take place between the cooling turbine and the second energy recovery turbine. Thus, in embodiments with a planetary gear as a coupling, the planetary gear is located on the second shaft between the cooling turbine and the second energy recovery turbine. Arranging the coupling in this manner makes it possible to reduce the effort involved in mounting the second shaft and minimize the length of the shaft.

Alternatively, some embodiments have the coupling of the second shaft to the energy sink disposed outside the cooling turbine and the second energy recovery turbine, in particular on the side of the cooling turbine.

A further embodiment has an air filter that filters the intake air prior to the compression stage in the compressor. This makes it possible to ensure that no harmful impurities enter the compressor and the cooling stages or even the cylinder.

The invention also relates to a method for providing boost air for a cylinder of an internal combustion engine. The method comprises compressing the intake air to a pressure that is higher than a boost pressure of the internal combustion engine. The compressed air is then expanded to the boost pressure and cooled by at least a cooling turbine. The compressed air may be cooled by a boost air cooler prior to being cooled by the cooling turbine, and only then enters the cooling turbine. Energy is furthermore recovered from the exhaust gas mass flow by a first and a second energy recovery turbine. The energy recovered by the first energy recovery turbine is used to operate the compressor. According to the invention, the second energy recovery turbine and the cooling turbine transmit energy to a second shaft and the energy of the second shaft is present as rotational energy and is transmitted to an energy sink.

An embodiment and advantageous aspects of the invention will be explained in more detail in the following with reference to the accompanying drawing.

BRIEF DESCRIPTION OF THE DRAWINGS

FIG. 1 shows a charging system 20 for an internal combustion engine according to an embodiment of the invention.

DETAILED DESCRIPTION

FIG. 1 shows an embodiment of the charging system 20 for an internal combustion engine 10 that has an engine block 11 and six cylinders 12. The charging system 20 is responsible for supplying the boost air 44 required for combustion in the cylinders 12. The components of the charging system 20 are a compressor 22, an intercooler 23, a cooling turbine 24 and first and second energy recovery turbine 25, 26.

Intake air 41 drawn in by the internal combustion engine 10 first reaches an air filter 21 that first filters the intake air 41 and thus removes from the air pollutants or constituents that are harmful to the components of the charging system 20. The intake air 41 then enters a compressor 22 that compresses the intake air 41 to a pressure that is higher than the boost pressure of the boost air when it flows into the cylinder 12. Compression also increases the temperature of the compressed air 42. To lower the temperature again, the compressed air 42 is directed into the boost air cooler 23 and the cooled air 43 then passes to the cooling turbine 24 where the air is expanded to the boost pressure and cooled. This arrangement makes it possible to cool the boost air 44 to such an extent that its temperature is below the temperature of the intake air 41 and thus also below the ambient temperature and the necessary boost pressure is nonetheless present. The cooled boost air 44 then enters the cylinders 12.

After combustion in the cylinders 12, an exhaust gas mass flow 45 is discharged during the exhaust stroke of the cylinder, is divided and enters the first and the second energy recovery turbines 25, 26. The two energy recovery turbines are disposed in parallel. The first energy recovery turbine 25 is disposed with the compressor 22 on a common first shaft 31, and the first energy recovery turbine 25 can then operate the compressor 22. The second energy recovery turbine 26 is disposed with the cooling turbine 24 on a common second shaft 32. Thus, both the second energy recovery turbine 26 and the cooling turbine 24 transmit an accelerating torque to the second shaft 32. The second shaft 32 is coupled to an energy sink via a gearing 33, so that the rotational energy transmitted to the second shaft 32 can either be reused directly, for example to operate the boost air cooler 23, or temporarily stored in a battery or other energy store. The gearing 33 is embodied as a planetary gear, for example, and in the shown embodiment is disposed in the vicinity of the cooling turbine 24 on a portion of the second shaft 32 that is not located between the cooling turbine 24 and the second energy recovery turbine 26.

This embodiment provides a compact charging system 20 with efficient cooling of the boost air pressure and makes the best possible use of the expended energy. The arrangement of the first and the second energy recovery turbines 25, 26 enables optimal recovery of the energy contained in the exhaust gas mass flow 45. Even if a maximum boost pressure is exceeded by the compression, the boost air 44 can be expanded again by the cooling turbine 24 and thus cooled. This greater expansion results in greater cooling. The exhaust gas mass flow can alternatively be directed more to the second energy recovery turbine 26, so that the compressor is driven to a lesser extent by the first energy recovery turbine 25. Supplying the second energy recovery turbine 26 with a larger exhaust gas mass flow causes a larger proportion of its energy to be transmitted to the second shaft 32 and passed from there via the coupling to an energy sink for further use. The energy of the exhaust gas mass flow can thus always be recovered in the best possible way, even if the compressor already is compressing the intake air to a maximum pressure level.

LIST OF REFERENCE SIGNS

10 Internal combustion engine
11 Engine block
12 Cylinder
20 Charging system
21 Air filter
22 Compressor
23 Boost air cooler
24 Cooling turbine
25 First energy recovery turbine
26 Second energy recovery turbine
31 First shaft
32 Second shaft
33 Gearing
41 Intake air
42 Compressed air
43 Cooled air
44 Boost air
45 Exhaust gas mass flow

The invention claimed is:

1. A charging system (20) for an internal combustion engine (10) having at least one cylinder (12), comprising:
    a first energy recovery turbine (25) and a second energy recovery turbine (26) connected in parallel to one another and connected to the at least one cylinder (12) so that an exhaust gas mass flow (45) discharged from the at least one cylinder (12) is divided with selected proportions of the exhaust gas mass flow (45) being directed respectively to the first and second energy recovery turbines (25, 26);
    a compressor (22) connected to the first energy recovery turbine (25) by a first shaft (31), the compressor (22) compressing intake air (41) and producing compressed air (42) at a pressure that is higher than a required boost pressure of a boost air (44) when the at least one cylinder (12) is being filled;
    a boost air cooler (23) that cools the air (42) compressed by the compressor (22) and thereby produces cooled air (43);
    a cooling turbine (24) connected to the second energy recovery turbine (26) by a second shaft (32), the cooling turbine (24) receiving the cooled air (43) directly from the boost air cooler (23) and further cooling and expanding the cooled air (43) to the required boost pressure and directing the cooled and expanded cooled air (43) directly to the at least one cylinder (12); and
    wherein an end of the second shaft (32) on a side of the cooling turbine (24) remote from the second energy recovery turbine (26) is coupled to at least one energy sink.

2. The charging system (20) of claim 1, wherein the end of the second shaft (32) on a side of the cooling turbine (24) remote from the second energy recovery turbine (26) is coupled to the boost air cooler (23) as the at least one energy sink so that rotational energy transmitted to the second shaft (32) by the exhaust mass flow (45) is used to operate the boost air cooler (23).

3. The charging system (20) of claim 2, wherein the boost air cooler (23) is disposed between the compressor (22) and the cooling turbine (24).

4. The charging system (20) of claim 1, wherein the cooling turbine (24) is configured to expand and cool the compressed air (42) such that a temperature of the compressed air (42) is the same as or less than an ambient temperature of the intake air (41).

5. The charging system (20) of claim 1, wherein the second shaft (32) is coupled to the drive train as an energy sink.

6. The charging system (20) of claim 5, wherein the second shaft (32) is coupled to the energy sink by a planetary gear.

7. The charging system (20) of claim 1, further comprising an air filter (21) that is configured to filter the intake air.

8. A method for providing boost air (44) for cylinders (12) of an internal combustion engine (10), comprising:
    directing an exhaust gas mass flow (45) from the cylinders (12) to a first energy recovery turbine (25) and a second energy recovery turbine (26) that are connected in parallel so that the first and second energy recovery turbines (25, 26) receive selected proportions of the exhaust gas mass flow (45),
    using energy from the first energy recovery turbine (25) to rotate a first shaft (31) and to thereby operate a compressor (22) via the first shaft (31) to compress intake air (41) to compressed air (42) at a pressure that is higher than a boost pressure of the internal combustion engine (10),
    directing the compressed air to a boost air cooler (23) that cools the compressed air (42) compressed by the compressor (22) and thereby produces cooled air (43)
    using energy from the second energy recovery turbine (26) to rotate a second shaft (31), the second shaft (31) being connected to a cooling turbine (24) and to an energy sink so that energy from the second shaft (31) is used for further cooling the compressed air (42) from the boost air cooler (23) and then relaxing the compressed air (42) to the boost pressure and feeding a resulting boost air (44) directly from the cooling turbine (24) to the cylinders (12) and the energy from the second shaft (31) then is transmitted to the energy sink,
    wherein the proportion of exhaust gas mass flow (45) directed to the first energy recovery turbine (25) is selected to control compression of the intake air (41), and the proportion of the exhaust gas mass flow (45) directed to the second energy recovery turbine (26) rotates the second shaft (32) and rotational energy from the second shaft (32) controls the further cooling of the cooled air from the boost air cooler (23) by the cooling turbine (24) and the rotational energy from the second shaft (32) also is transmitted to the energy sink.

* * * * *